United States Patent [19]

Wilson

[11] 4,393,729
[45] Jul. 19, 1983

[54] GEAR SHIFT MECHANISM
[75] Inventor: Thomas E. Wilson, Troy, Mich.
[73] Assignee: Rockwell International Corporation, Pittsburgh, Pa.
[21] Appl. No.: 238,286
[22] Filed: Feb. 25, 1981
[51] Int. Cl.³ .............................................. G05G 5/24
[52] U.S. Cl. ...................................... 74/475; 74/527; 192/114 R
[58] Field of Search ................. 74/475, 477, 527, 529; 192/114 R

[56] References Cited
U.S. PATENT DOCUMENTS

| 1,976,309 | 10/1934 | Thomson | 74/475 |
| 3,016,759 | 1/1962 | Fletcher | 74/527 X |
| 3,800,617 | 4/1974 | Dornan | 74/527 X |

FOREIGN PATENT DOCUMENTS
806892 10/1936 France .............................. 74/475
2019963 11/1979 United Kingdom ................. 74/527

Primary Examiner—Allan D. Herrmann

[57] ABSTRACT

A gear shift mechanism is for a gear mounted on a shaft within the housing of a power transmitting device. A shift rod is mounted through a hole in the housing parallel with the shaft and is capable of axial movement between a first and a second position to cause corresponding movement of the gear. A locking lever is pivotally mounted within a slot in the shift rod and has an extended end capable of extending beyond the interior surface of the shift rod. The locking lever is pivotally biased to cause the extended end to overlie the housing adjacent the hold when the shift rod is in the first position. A camming rod is also mounted within the shift rod and can be moved axially to pivot the locking lever against biasing to release the shift rod during shifting from the first position to the second position.

4 Claims, 5 Drawing Figures 4,393,729

GEAR SHIFT MECHANISM

BACKGROUND OF THE INVENTION

1. Field of the Invention

This invention relates to a gear shift mechanism for a gear mounted on a shaft within a housing of a power transmitting device and, more specifically, to such a gear shift mechanism which can be selectively locked in one of two positions.

2. Description of the Prior Art

It is not uncommon for power transmitting devices to include gear shift mechanism which have locking features to prevent accidental and undesired engagement or disengagement of mating gears in the transmitting device. As evidenced by U.S. Pat. Nos. 2,434,051; 2,577,019; 2,969,690; 3,015,986; 3,405,596; 3,534,921 and 3,772,941, many different and some complicated shift mechanisms have been utilized to prevent the undesired shifting of the gears during the operation of such a power transmitting device.

While these above mentioned devices might work quite satisfactorily to prevent undesired movement of the gear, some are quite complicated and expensive to provide. Therefore, it is not uncommon in power transmitting devices to utilize a well known type of shift rod which is mounted parallel to the shaft including the gear to be shifted, which shift rod is capable of being moved axially to produce corresponding axial movement of the gear on the shaft. To prevent undesired axial movement of this type of shift rod, the housing for the power transmitting devices includes a ball and spring detent system having a ball member which is biased into a detent in the exterior surface of the shift rod. While these devices have also been successfully utilized in the past, there are some instances when power transmitting devices of this type generate sufficient force on the gear to overcome the resistance created by the ball-detent device of the shift rod and cause it to be relocated from the desired position. It is, therefore, a continuing problem to insure that such a gear shift mechanism will include a sufficiently reliable locking system to prevent undesired gear movement during any unusual or transitory operating conditions.

SUMMARY OF THE INVENTION

It is, therefore, an object of this invention to provide a gear shift mechanism for a gear mounted on a shaft mounted within a housing of a power transmitting device which can be utilized to prevent undesired movement of a gear from a shifted position.

It is another object of this invention to provide a gear shift mechanism which is relatively inexpensive and easy to manufacture.

To accomplish these and other objects of the invention, a preferred embodiment thereof includes a gear shift mechanism for a gear mounted on a shaft within the housing of a power transmitting device. The gear shift mechanism includes a shift rod mounted parallel with the shaft and capable of axial movement between a first and a second position. The shift rod extends through a hole in the housing to have an external end and an internal portion. A coupling means is rigidly mounted on the internal portion coupling the shift rod to the gear to cause the gear to be capable of moving in response to the movement of the shift rod. A locking lever is pivotally mounted within a slot in the shift rod and has an extended end thereof which is capable of extending beyond an external surface of the shift rod. The locking lever is pivotally biased to cause the extended end to overlie the housing adjacent the hole when the shift rod is in the first position and to make sliding contact with an interior surface of the hole when the shift rod is in the second position and between the first and the second positions. There is included means for retracting the extended end of the locking lever to be within the slot when the shift rod is selectively moved from the first position to the second position.

DESCRIPTION OF THE PREFERRED EMBODIMENT

Figure 1:
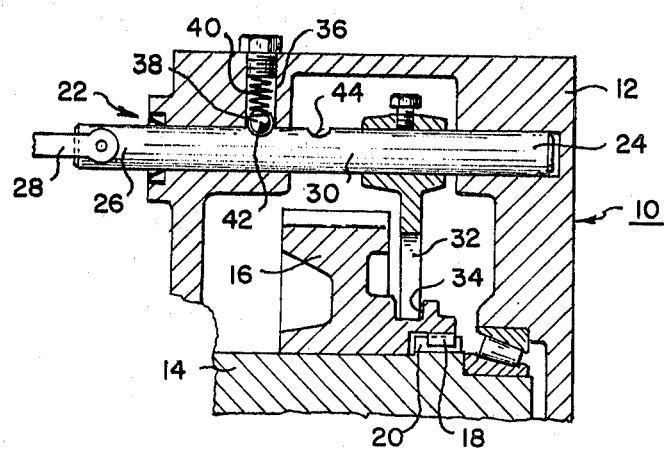
FIG. 1 is a fragmentary, sectional side view of the power transmitting device including a prior art gear shift mechanism.

As seen in FIG. 1, a typical power transmitting device 10 includes a housing 12 with a shaft 14 mounted for rotation therein. A gear 16 is mounted on the shaft 14 and is capable of being axially relatively moved thereon. In the axial position shown in FIG. 1, the gear 16 includes a set of internal teeth 18 which are meshed with and matingly engage a set of external teeth 20 of the shaft 14. As thus positioned, the gear 16 will rotate with the shaft 14. However, should the operation of the power transmitting device 10 require, the gear 16 can be moved axially to disengage the teeth 18 from the teeth 20 to allow independent rotation of the shaft 14 and the gear 16.

For this purpose, the prior art device of FIG. 1 includes a gear shift mechanism 22 which is simple and easy to provide and is similar to many such devices which are quite common in the power transmitting field. The gear shift mechanism 22 includes a shift rod 24 which is mounted parallel with the shaft 14 and is capable of being moved axially within the housing 12. An external end 26 thereof is coupled by a clevis 28 to shifting linkage (not shown) located elsewhere in the vehicle. The interior portion 30 of the shift rod 24 has a bifrucated fork 32 rigidly mounted thereon. The extended ends of the fork 32 mate with an external groove 34 on the gear 16 so that the gear 16 is coupled to the shift rod 24 in a manner which will cause it to move in response to any axial movement of the shift rod. Similarly, if outside forces acting on the gear 16 are sufficient, the gear 16 might move axially relative to the shaft 14 and thus cause axial movement of the shift rod 24.

To resist such undesired and unintentional movement of the gear 16, the prior art shift mechanism 22 includes a ball-detent device tending to resist movement of the shift rod 24 from a normal shift position. A sealed bore 36 in the housing 12 includes a ball 38 and a biasing spring 40 tending to force the ball 38 toward the shift rod 34. A pair of detents 42 and 44 in the surface of the shift rod 24 are provided for the receipt of the ball 38 therein when the shift rod 24 is located in either of the two normally selected positions. As shown in FIG. 1, the ball 38 is located in the detent 42 when the shift rod 24 is in a first position for the selective engagement of the gear 16 with the shaft 14. Movement by the shifting linkage to the left through the clevis 28 will apply sufficient axial force to the shift rod 24 to depress the ball 38 against the biasing action of the spring 40 and allow axial movement of the shift rod 24 to the left. As the rod 24 moves to the left, the fork 32 will act on the gear 16 to disengage the teeth 18 and 20. When the shift rod 24 is sufficiently moved to insure such disengagement, the detent 44 will be aligned with the ball 38 for the receipt of the ball 38 therein to again resist unintentional axial movement of the shift rod 24 until reengagement of the gear 16 with the shaft 14 is desired.

While the device shown in FIG. 1 is quite common, it represents only one of many possible such gear, shaft and shift rod configurations. There are any number of configuratons for the movement of gears on shafts, the engagement of gears with other gears and the multiple engagement of multiple gear teeth with other gears and/or shafts which are quite common in the power transmitting field. Therefore, while the prior art device shown in FIG. 1 serves as an example of the type of installation in which the present invention can be utilized, the gear shift mechanism of the present invention is not limited to this particular installation.

Figure 2:
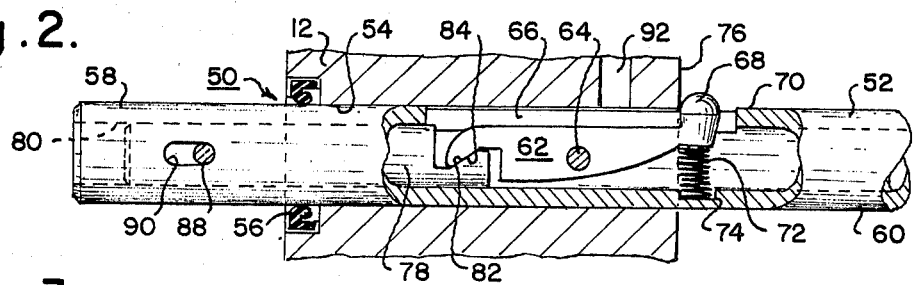
FIG. 2 is a fragmentary side view partially in section of the preferred gear shift mechanism in a locked position.
Figure 3:
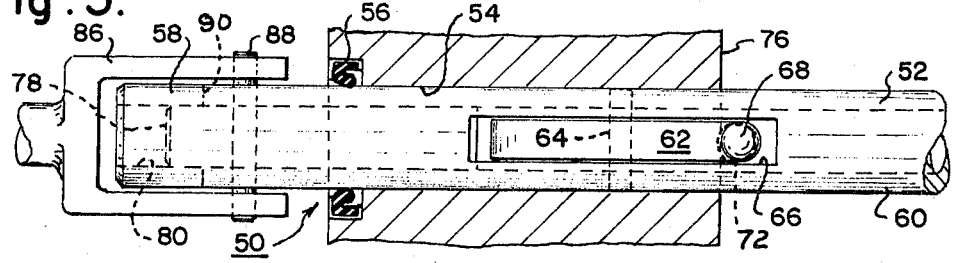
FIG. 3 is a top view of the gear shift mechanism as shown in FIG. 2.
Figure 4:
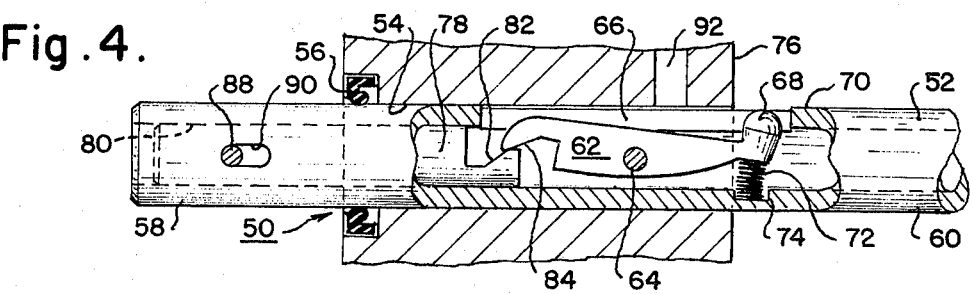
FIG. 4 is a view of the gear shift mechanism of FIG. 2 as it is being moved from the locked position.
Figure 5:
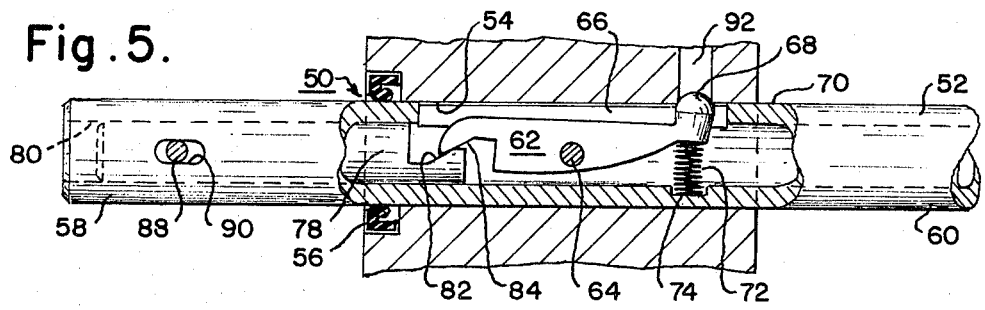
FIG. 5 is the gear shift mechanism of FIG. 2 in the unlocked position.

Nevertheless, the preferred gear shift mechanism 50, as shown in FIGS. 2–5, could be substituted for the prior art gear shift mechanism 22 of the power transmitting device 10 to demonstrate various features of the invention. A shift rod 52 of the mechanism 50 is mounted parallel with the shaft 14 and is capable of axial movement between a first position, as shown in FIG. 2, and a second position, as shown in FIG. 5. The shift rod 52 extends through a hole 54 in the housing 12 with a seal 56 extending around its periphery to prevent loss of lubricating fluid from within the transmitting device. An external end 58 of the shift rod 52 is capable of being joined to the shifting linkage (not shown) for selective positioning of the shift rod 52 with the internal portion 60 having a fork mounted thereon for shifting the gear in the manner described hereinabove.

To prevent unintentional movement of the gear shift mechanism 50 from the first position, as shown in FIG. 2, a locking lever 62 is pivotally mounted at a pin 64 within a slot 66 formed in the shift rod 52. An extended end 68 of the lever 62 is capable of extending beyond the exterior surface 70 of the shift rod 52. The extended end 68 is biased by a spring 72 which is mounted within the shift rod 52 at a recess 74 so that the extended end 68 overlies the interior 76 of the housing 12 adjacent the hole 54. In this position, the locking lever 62 prevents any movement of the shift rod 52 away from the first position outside forces acting upon the gear 16 apply a force to the fork which would otherwise tend to move the shift rod 52 to the left.

Therefore, a simple shifting linkage directly coupled to the rod which was utilized to move the rod 24 of the prior art device could not be employed with the shift rod 52 since any means which failed to retract the extended end 68 would still not produce the movement of the shift rod 52 from the first position. To retract the extended end 68, a camming rod 78 is mounted within a central bore 80 within the shift rod 52. The camming rod is capable of limited relative axial movement within the shift rod 52 and has a camming surface 82 thereon which is aligned with a camming surface 84 on the locking lever 62. Movement of the camming rod relative to the shift rod 52 and the locking lever 62 will cause the camming surface 82 to act on the camming surface 84 of the locking lever to cause it to pivot against the biasing of the spring 72 to retract the extended end 68 to be in alignment with the exterior surface 70 of the shift rod 52. Therefore, rather than having a clevis of the shift linkage directly coupled to the shift rod 52 as was the case with the shifting mechanism 22 discussed hereinabove, the preferred embodiment includes a clevis 86 with a clevis pin 88 which is directly coupled to the camming rod 78. The clevis pin 88 extends through an elongated slot 90 in the shift rod 52 so that movement of the clevis 86 to the left will cause the camming rod 78 to move to the left, as shown in FIG. 4, to pivot the locking lever 62 and retract the extended end 68.

When the camming lever has retracted the extended end 68, the clevis pin 88 will make contact with the interior surface at the end of the elongated slot 90 to act directly on the shift rod 52. Further movement of the clevis 86 to the left will then relocate the shift rod 52 to a location other than the first position as shown in FIGS. 2, 3 and 4. When the shift rod 52 is selectively relocated to a second position, the force on the shift linkage and the clevis 86 will be relaxed and allow the biasing of the spring 72 to again act on the locking lever 62. As shown in FIG. 5, when the rod 52 is located at the second position, the extended end 68 is received within a sealed bore 92 in the wall of the housing 12 to resist any further undesired or unintentional movement of the shift rod 52 in a similar manner to the ball-detent system described for the prior art device hereinabove. The diameter of the bore 92 is sufficiently small to insure that the extended end 68 is only partially received within the sealed bore 92 causing it to act like a detent. Movement of the shift rod 52 to the right from the position shown in FIG. 5 is resisted but not prevented since the rounded upper surface of the extended end 68 would simply offer resistance to its relative movement within the hole 54 as it would have to be displaced against the biasing of the spring 72.

In fact, the actual pivotal position of the locking lever 62 during the movement of the shift rod 52 from the first position to the second position would depend on the strength of the spring 72 relative to the friction created within the hole 54 by the movement of the shift rod 52 therein. If the friction is not too great, the spring would tend to cause the extended end 68 to constantly make contact with the interior of the hole 54 until the extended end 68 was aligned with the bore 92 for its partial receipt therein. In other words, the camming rod may produce retraction of the extended end 68 but may not prevent it from making sliding contact under the biasing of the spring 72 along the interior surface of the hole 54 throughout the movement of the shift rod 52 from the first position to the second position as shown in FIG. 5.

Although the preferred embodiment of the invention shown in FIGS. 2–5 represents a gear shift mechanism which could be utilized for one common configuration of power transmitting devices, it should be clear that any number of alterations may be made to either the camming rod or the locking lever to produce a similar effect. In other words, there may be camming surfaces located at other locations on the camming rod or the locking lever to produce the same desired retraction of the extended end whether going in one direction of the shift rod or in another direction of the shift rod. Additionally, it would be possible to mount two or more similar locking levers and/or camming rods to have selective locking at various positions in the axial movement of a shift rod. Clearly, alterations can, therefore, be made to the preferred embodiment of the invention as shown without departing from the scope of the invention as claimed.

I claim:

1. A gear shift mechanism for a gear mounted on a shaft within the housing of a power transmitting device comprising:
   a shift rod mounted parallel with said shaft and capable of axial movement between a first and a second position, said shift rod extending through a hole in said housing to have an external end and an internal portion;
   coupling means rigidly mounted on said internal portion coupling said shift rod to said gear to cause said gear to be capable of moving in response to said movement of said shift rod;
   a locking lever pivotally mounted within a slot in said shift rod and having an extended end thereof capable of extending beyond an external surface of said shift rod;
   said locking lever being pivotally biased to cause said extended end to overlie said housing adjacent said hole when said shift rod is in said first position and to make sliding contact with an interior surface of said hole when said shift rod is in said second position and between said first and said second positions; and
   means for retracting said extended end of said locking lever to be within said slot when said shift rod is selectively moved from said first position to said second position.

2. A gear shift mechanism as set forth in claim 1, wherein said locking lever is biased by a spring means mounted in said slot at said extended end of said locking lever.

3. A gear shift mechanism as set forth in claim 1, wherein said means for retracting said extended end includes a camming rod mounted within said shift rod for axial movement, said camming rod having a camming surface thereon making contact with said locking lever to pivot said locking lever against said biasing when said camming rod is moved relative to said shift rod in a direction corresponding to the direction required for said shift rod to move from said first position to said second position.

4. A gear shift mechanism as set forth in claim 1, further including a detent means in an interior surface of said hole aligned with said extended end when said shift rod is in said second position to cause said extended end to be partially received therein under said biasing to resist movement of said shift rod from said second position.

* * * * *